Aug. 26, 1958 P. BJERRE 2,849,261
DISC BEARING
Filed Feb. 20, 1956 2 Sheets-Sheet 1

INVENTOR.
PEDER BJERRE
BY
*James E. Nilles*
ATTORNEY.

INVENTOR.
PEDER BJERRE
BY James E. Nilles
ATTORNEY.

United States Patent Office 2,849,261
Patented Aug. 26, 1958

2,849,261

DISC BEARING

Peder Bjerre, Toronto, Ontario, Canada, assignor to Massey-Ferguson Inc., a corporation of Maryland Application February 20, 1956, Serial No. 566,445

1 Claim. (Cl. 308—181)

This invention relates to a sealed, anti-friction bearing assembly which finds particular utility in conjunction with earth working tools such as disc blades which are often used with grain drills, for example.

The bearings which rotatably support these discs on the implement frame are located close to the ground when in the working position and are constantly subjected to dust, dirt, mud, crop material and other foreign matter. With the advent of higher operating ground speeds for implements of this character, it is essential that anti-friction bearings be employed for these blades. These bearings must be sealed against the foreign matter and protected from injury from stones with which they come into contact. One type of implement with which the invention finds particular utility is a grain drill which often utilizes a "double disc" type furrow opener. This opener consists of a pair of discs mounted on a single support post in back to back relationship. In a grain drill a plurality of these openers are used and each has its separate grain tube and booth adjacent to it. It is necessary therefore, because of space limitations, to keep the width of these double disc openers as narrow and compact as possible. It is also desirable to make these disc bearing assemblies small in diameter for good ground clearance and of smooth design so as to preclude the entanglement of trash therewith.

These discs must frequently be replaced, as they become worn, and it is essential therefore that they are readily removable and that the associated bearing assemblies are of economical design.

It is therefore an object of this invention to provide a sealed, anti-friction bearing assembly for an earth working blade which is highly compact and economical to manufacture and which permits easy access to the bearing for lubrication or maintenance, as well as easy removal of the tool from its support frame.

It is another object of the invention to provide a sealed anti-friction bearing assembly having novel means for securing it to its associated disc, protecting it from foreign matter and which permits ready removal of the assembly and disc from its support structure.

It is generally an object of this invention to provide an improved anti-friction, sealed bearing for an earth working tool.

Other objects and advantages will become more apparent from the following detailed description, taken in conjunction with the attached sheet of drawings in which, by way of preferred example only, is illustrated the invention.

Figures 1, 3:
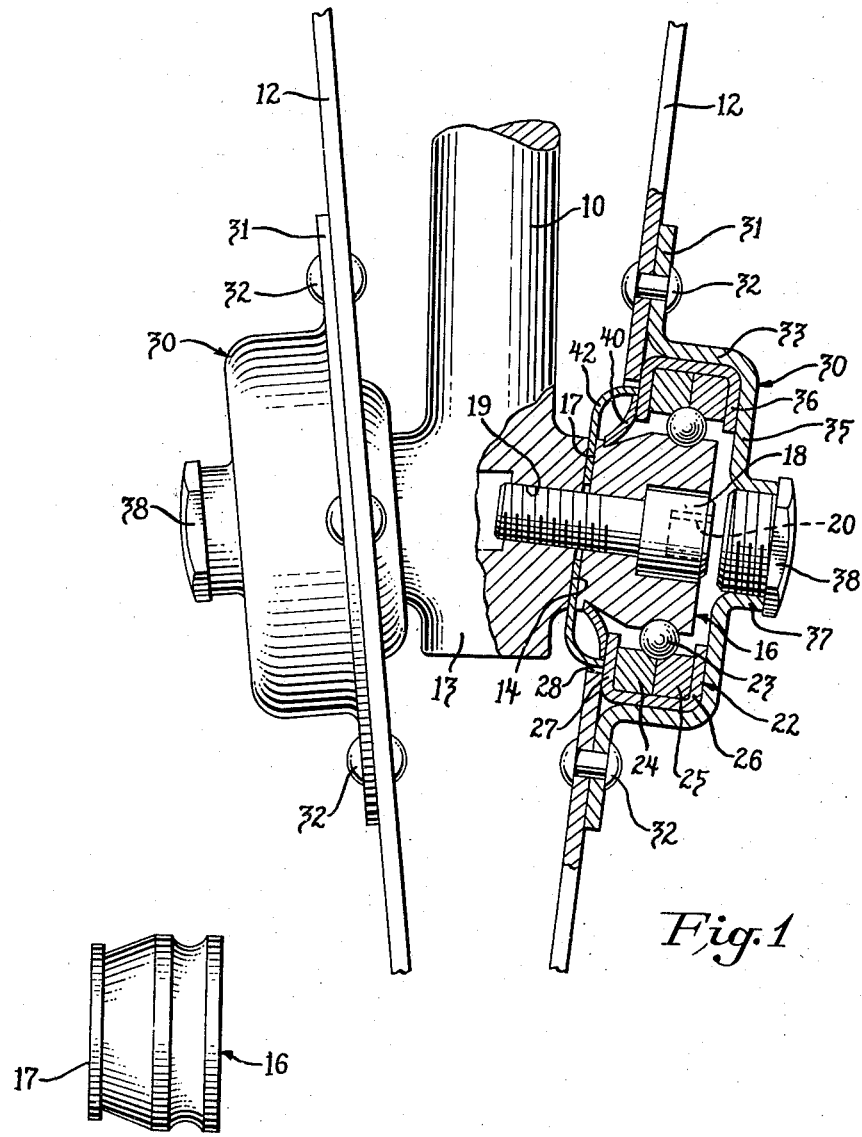
Figure 1 is an elevational view, partially in section, of a bearing assembly made in accordance with the invention, for a double disc-type opener.
Figure 3 is an enlarged view of the inner race shown in Figure 1.

Referring more particularly to Figure 1 of the drawings, the support structure takes the form of a post of frame member 10 which is part of the implement (not shown) and adapted to travel over the ground. In the double disc type of opener, a disc blade 12 is rotatably mounted on either side of the post or frame 10 at the lower end 13 thereof. As the bearing assemblies for the discs 12 are identical, it will be understood that like numbers apply to similar parts. The post 10 has a flat portion 14 adjacent its lower end. An inner bearing ring or race 16, shown best in Fig. 3, is rigidly secured at its inner side 17 to frame 10 by a fastening means such as a stud or cap screw 18, which is threadably engaged in the tapped hole 19 of the frame. The fastening means 18 shown here as a socket head cap screw has an irregular shaped hole 20 in its end which receives a mating tool such as an "Allen" wrench (not shown) for attaching or removing the screw from the frame.

An outer bearing ring or race 22 is concentrically located around the inner race and rotatably supported thereon by the anti-friction bearing members 23 which are interposed therebetween. The outer race 22 is shown here, for purposes of illustration, as complementary half races 24, 25 secured together by the channel ring 26. The inner side 27 of the outer race abuts against the earth working tool 12 which has a large aperture 28 circumscribing the inner race.

A combined protective cover and securing means is provided for securing the races to the disc and this cover also includes a removable means which permits access to the inner race for purposes that will more fully appear hereinafter.

A cover 30, in the form of a stamped sheet steel housing, has an annular radially extending flange 31 which is secured at circumferentially spaced locations to the disc 12 by rivets 32. An axially extending flange 33 forms a press fit with the periphery of the outer race 22. Another radially extending flange 35 embraces the outer side 36 of the outer race. Thus the outer race, and consequently the inner race, are operatively fixed relative to the disc. The housing 30 of Fig. 1 has an outwardly turned flange 37 which is threaded on its internal surface to receive the removable threaded cap 38.

Between the inner sides of the races 16 and 22 is positioned a flexible seal member 40 which precludes the entry of foreign material therebetween. A slinger 42 may also be provided between the support 10 and inner race 16 which acts to protect seal 40. Seal 40 and slinger 42 are conventional and require no further description here.

Figure 2:
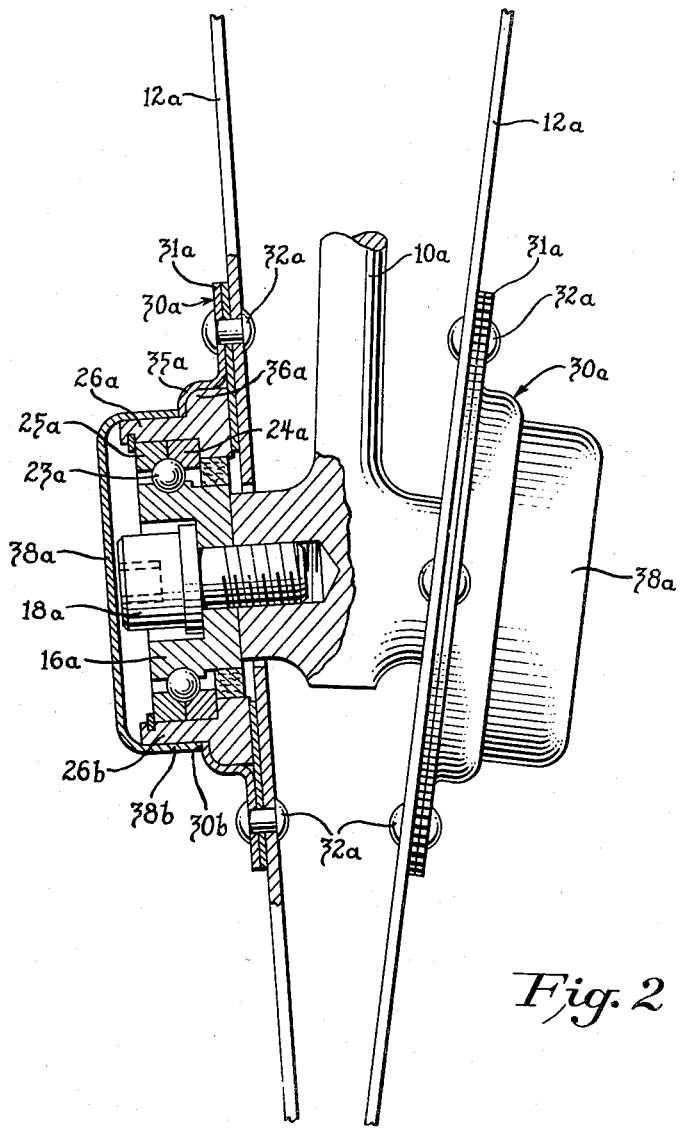
Figure 2 is a fragmentary elevational view, partially in section, of a bearing assembly made in accordance with the invention and which is a modification of the embodiment shown in Figure 1.

In the embodiment shown in Figure 2, it will be noted that parts which correspond with those of Figure 1 have been identified by similar numerals having the suffix "a." In this embodiment, however, the outer edge of the housing 30a terminates in a radial flange 35a which embraces a shoulder 36a on the outer race 26a. A flat cap 38a forms the removable means in this embodiment and its annular flange 38b forms a snug sliding fit with the annular surface 26b of the outer race. Cap 38a abuts against the housing 30a at 30b and acts to enclose the entire bearing unit and is capable of being readily slipped off for purposes to be described.

The removable means 38, 38a afford access to the inner races 16, 16a and permits a tool to be inserted in the screws 18, 18a, as previously mentioned, for removing the inner race and consequently the entire bearing assembly and disc, from the support structure.

By means of this invention there has been provided an anti-friction bearing which can be packed in grease and thereafter requires very little lubrication. The bearing is effectively sealed and protected yet the entire assembly may be easily removed from its support. A narrow, compact and cleanly designed bearing assembly, which is economical to manufacture is thus provided.

It should be understood that it is not intended to limit the invention to the above described forms and details, and that the invention includes such other forms and modifications as are embraced by the scope of the appended claim.

What is desired to be secured by Letters Patent is:

A sealed anti-friction bearing assembly for rotatably mounting an earth working blade on a support structure comprising, an inner race detachably secured to said structure, an outer race concentrically positioned around said inner race, said outer race having a shoulder and an annular surface, anti-friction members between said inner and outer races for rotatably supporting the latter on the former, an earth working blade positioned on one side of said races, a housing rigidly secured to said blade and engaging said shoulder of said outer race to rigidly secure it to said blade, flexible sealing means between said inner and outer races at said one side thereof, a removable cap member on the other side of said races and slidable over said annular surface of said outer race whereby removal of said cap member affords access to said inner race for detaching the latter from said structure.

References Cited in the file of this patent

UNITED STATES PATENTS

| | | |
|---|---|---|
| 2,105,120 | Johnson | Jan. 11, 1938 |
| 2,560,965 | Lewis | July 17, 1951 |